US007320508B2

(12) United States Patent
Booker et al.

(10) Patent No.: US 7,320,508 B2
(45) Date of Patent: Jan. 22, 2008

(54) ROLLER AND STOPPER MECHANISM FOR A DRAWER SLIDE SYSTEM

(75) Inventors: Todd Booker, Garner, NC (US); Georg Domenig, Kernersville, NC (US)

(73) Assignee: Grass America Inc., Kernersville, NC (US)

( * ) Notice: Subject to any disclaimer, the term of this patent is extended or adjusted under 35 U.S.C. 154(b) by 96 days.

(21) Appl. No.: 10/844,889

(22) Filed: May 13, 2004

(65) Prior Publication Data

US 2004/0227444 A1 Nov. 18, 2004

Related U.S. Application Data

(60) Provisional application No. 60/470,131, filed on May 13, 2003.

(51) Int. Cl.
*A47B 88/00* (2006.01)
(52) U.S. Cl. .............................. 312/334.6; 312/334.46
(58) Field of Classification Search ........... 312/334.45, 312/334.6, 334.14, 334.15, 334.25, 334.31, 312/334.32, 334.33, 334.34, 334.38, 334.44, 312/334.46, 334.47; 384/18–21
See application file for complete search history.

(56) References Cited

U.S. PATENT DOCUMENTS

| 4,387,942 | A |   | 6/1983  | Lense |  |
|---|---|---|---|---|---|
| 4,659,237 | A |   | 4/1987  | Rapp |  |
| 4,752,143 | A |   | 6/1988  | Lautenschlager, Jr. |  |
| 5,344,227 | A | * | 9/1994  | Rock et al. ............... | 312/334.6 |
| 5,536,083 | A |   | 7/1996  | Brustle et al. |  |
| 5,775,787 | A | * | 7/1998  | Gasser ................... | 312/334.46 |
| 5,775,788 | A | * | 7/1998  | Sasse et al. ............ | 312/334.38 |
| 5,882,100 | A |   | 3/1999  | Rock |  |
| 5,902,029 | A |   | 5/1999  | Fulterer |  |
| 6,015,199 | A | * | 1/2000  | Netzer et al. .......... | 312/334.46 |
| 6,280,086 | B1 | * | 8/2001  | Stijns .......................... | 384/18 |
| 6,682,160 | B2 | * | 1/2004  | Kung ...................... | 312/334.6 |
| 6,736,471 | B2 | * | 5/2004  | Lin .......................... | 312/334.6 |
| 6,945,620 | B2 | * | 9/2005  | Lam et al. ............... | 312/334.6 |
| 2003/0222556 | A1 | * | 12/2003 | Larsen, Jr. ............... | 312/334.6 |

FOREIGN PATENT DOCUMENTS

JP            05123227        *   5/1993       ............. 312/334.6

OTHER PUBLICATIONS

International Search Report mailed Jan. 5, 2005 corresponding to PCT/US 04/14986.

* cited by examiner

*Primary Examiner*—Lanna Mai
*Assistant Examiner*—Hanh V. Tran
(74) *Attorney, Agent, or Firm*—Kilpatrick Stockton LLP

(57) ABSTRACT

A roller and stopper mechanism for drawer slide systems which overcomes the disadvantages of the prior art and effectively provides a low friction rolling surface between two drawer slides in directions parallel to and perpendicular to the length of the drawer slide, and provides a stopper to provide shock absorbing means to the system. The roller and stopper mechanism includes a body portion with two opposing ends and two opposing sides, and having a roller associated therewith, a first leg portion extending substantially perpendicular from one end of the body portion, and having a roller associated therewith, and a second leg portion extending substantially perpendicular from the opposite end of the body portion, and having a roller associated therewith.

3 Claims, 2 Drawing Sheets

ROLLER AND STOPPER MECHANISM FOR A DRAWER SLIDE SYSTEM

CROSS REFERENCE TO RELATED APPLICATIONS

The present application claims priority under 35 U.S.C. § 119(e) from U.S. Provisional Patent Application Ser. No. 60/470,131, filed May 13, 2003, the disclosure of which is incorporated herein by reference.

FIELD OF THE INVENTION

The present invention relates to a roller and stopper mechanism positioned between two drawer slides for providing a low friction sliding surface therebetween and minimizing jar and impact between the two drawer slides.

BACKGROUND OF THE INVENTION

In a standard drawer slide assembly, one drawer slide member is affixed to a furniture frame while a second drawer slide is affixed to the drawer body. A third drawer slide is often provided to provide additional extension of the drawer out from the furniture member. The drawer slides intermesh and slide upon one another as the drawer is pulled out and pushed into the furniture frame. In this manner the sliding motion of the drawer out and away from the furniture frame is facilitated.

These drawer slides are commonly manufactured from stainless steel or another rigid, strong material. To facilitate the sliding action of one drawer slide upon the other, a low friction sliding means is provided. A common approach is to mount rollers on one or both drawer slides for contacting and rolling upon the opposing drawer slide. In this manner, metal upon metal contact of the two drawer slides is avoided and the drawer slides are free to move upon one another in a low friction manner.

Another common approach is to position a long rectangular frame comprising a plurality of rollers on a track between the two opposing drawer slides. This further enhances the slideability of the drawer by providing a sliding surface between the drawers that moves with the drawer slide assembly to provide said sliding surface along the length of the drawer slide. This provides a low friction sliding means without having to place a large number of rollers along the entire length of the slide. A smaller number of rollers mounted to the rectangular frame can slide back and forth with the drawer slides to provide the low friction contact therebetween.

These prior art systems do have drawbacks. Both the fixed rollers and the moveable rectangular slide only provide roller contact between the slides in one direction, perpendicular to the axis of the roller. As such, any lateral shifting of the drawer slides, or a pushing force which is not parallel to the length of the drawer slide, may result in metal to metal contact of the drawer slides, or misalignment and disengagement of the slides. Once the drawer slides become misaligned, further closing force can cause one slide to disengage and damage various components of the drawer slide system.

Another problem commonly seen in drawer slide systems is a jarring force experienced when the drawer is closed with too much force and the two drawer slides collide in the closed position. This can damage the drawer slide and possibly damage the contents of the drawer. Prior art attempts to mitigate this slamming of the drawer include rubber or felt bumpers on the rear of the drawer face to contact the furniture frame prior to the metal to metal contact of the drawer slides, or rubber or plastic bumpers mounted to various parts of the drawer slides. Both of these solutions are somewhat effective, but do not alleviate the jarring which can come from drawer slamming collisions.

As such, there is a need for a roller means for drawer slides which provides a low friction rolling surface between two drawer slides and also protects against lateral movement of one slide relative to the other.

Further, a bumper or shock absorber mechanism to absorb the shock of the slammed drawer that is an improvement over the prior art, is also desired.

Prior drawer slide roller/stopper mechanisms have not combined advantages of a roller mechanism to provide a low friction rolling surface parallel to and perpendicular to the length of the drawer slide with those of a stopper or shock absorbing means that overcome disadvantages of prior art drawer slide rollers or stoppers which fail to account for the jarring and potentially damaging forces experienced by drawer slide systems.

It is to these perceived needs that the present invention is directed.

SUMMARY OF THE INVENTION

The present invention provides a roller and stopper mechanism for drawer slide systems which overcomes the disadvantages of the prior art and effectively provides a low friction rolling surface between two drawer slides in directions parallel to and perpendicular to the length of the drawer slide, and provides a stopper to provide shock absorbing means to the system.

In a first aspect of the present invention, a roller and stopper mechanism for placement between two drawer slide members is provided comprising a body portion comprising two opposing ends and two opposing sides, and having a roller associated therewith, a first leg portion extending substantially perpendicular from one end of the body portion, and having a roller associated therewith, and a second leg portion extending substantially perpendicular from the opposite end of the body portion, and having a roller associated therewith.

In one embodiment of the present invention, the body portion comprises a plurality of rollers associated therewith. In another embodiment of the present invention, the first leg portion comprises a plurality of rollers associated therewith. In an additional embodiment of the present invention, the second leg portion comprises a plurality of rollers associated therewith.

In an additional embodiment of the present invention, the roller and stopper mechanism further comprises spring means extending from each of the opposing sides of the body portion. The spring means comprises at least one arm extending from the body portion at an angle which is not perpendicular or parallel to the opposing sides of the body portion. In a preferred embodiment of the present invention, the spring means comprises two arms extending from the body portion at angles which are not perpendicular or parallel to the opposing sides of the body portion.

In a second aspect of the present invention, a drawer slide system is provided comprising a first drawer slide comprising a first surface and having a second and third surface extending from the first surface in a direction substantially parallel to one another, a second drawer slide for engaging with and sliding upon said first drawer slide comprising a first surface substantially parallel to the first surface of the first drawer slide and corresponding second and third surfaces wherein the second drawer slide is configured so as to fit over and encompassing the first drawer slide, and a roller and stopper mechanism residing between the first and second drawer slides, said roller and stopper mechanism comprising a body portion comprising two opposing ends and two opposing sides, and having a roller associated therewith, a first leg portion extending substantially perpendicular from one end of the body portion, and having a roller associated therewith, and a second leg portion extending substantially perpendicular from the opposite end of the body portion, and having a roller associated therewith.

In one embodiment of the present invention, the roller and stopper mechanism is free to slide between the first and second drawer slides and further provide a low-friction sliding surface between the drawer slides. In another embodiment of the present invention, the first drawer slide comprises stopper engagement means for contacting and stopping the movement of the roller and stopper mechanism along the drawer slide. Preferably, the first and second drawer slides comprises stopper engagement means for contacting and stopping the movement of the roller and stopper mechanism along the drawer slide. These stopper engagement means optionally comprise protrusions extending from each of the opposing sides of the body of the roller and stopper mechanism. Further, the drawer slide system optionally comprises an additional roller and stopper mechanism positioned between the first and second drawer slides.

The stopper is mounted on an intermediate drawer slide, the two legs extend downward around the sides of the drawer slide and the top rests on the top of the drawer slide. The top drawer slide member is placed over the stopper such that the stopper travels within the space defined by the two drawer slides. Each of the drawer slides has a protrusion thereon which engage either side of the stopper when the drawer is in the fully extended position. In one embodiment of the present invention, the protrusions on the drawer slide engage the flexible protrusions of the stopper. As the drawer slide reaches the end point of its extension, the protrusion on the drawer slide engages the flexible protrusion on the stopper and the flexible protrusion bends, thereby absorbing the momentum and stopping the drawer. This allows the drawer to be stopped without the banging or knocking sound associated with conventional drawers that occurs when the slide is fully extended and the ends of the two metal drawer slides hit one another.

In a preferred embodiment of the present invention, the flexible protrusions on the stopper are preferably made of one-piece plastic construction. They comprise two flexible arms which bend outward in opposite directions. The flexible protrusions also comprise two leg members to engage sockets in the stopper and hold the flexible protrusions in place.

The stopper includes rollers to assist in its travel between the two drawer slide members. As the drawer slides move relative to each other, the stopper rolls freely between the two keeping them separated and enhancing the sliding motion of the assembly. In a preferred embodiment of the present invention, there are three rollers on the top of the stopper and two rollers on each leg of the stopper. The rollers are built into the various faces of the stopper such that they protrude slightly from either side. This allows the roller to engage both the top and intermediate drawer slide members of which the stopper is placed between. The rollers are held in place in apertures in the stopper through the interaction of indentations in the top and bottom of the roller and protrusions in the top and bottom of the roller cavity. The protrusions extend into the indentations allowing the roller to spin but not move out of the roller cavity.

Features of a roller and stopper of the present invention may be accomplished singularly, or in combination, in one or more of the embodiments of the present invention. As will be appreciated by those of ordinary skill in the art, the present invention has wide utility in a number of applications as illustrated by the variety of features and advantages discussed below.

As will be realized by those of skill in the art, many different embodiments of a roller and stopper mechanism for a drawer slide system according to the present invention are possible. Additional uses, objects, advantages, and novel features of the invention are set forth in the detailed description that follows and will become more apparent to those skilled in the art upon examination of the following or by practice of the invention.

DETAILED DESCRIPTION

Figure 1:
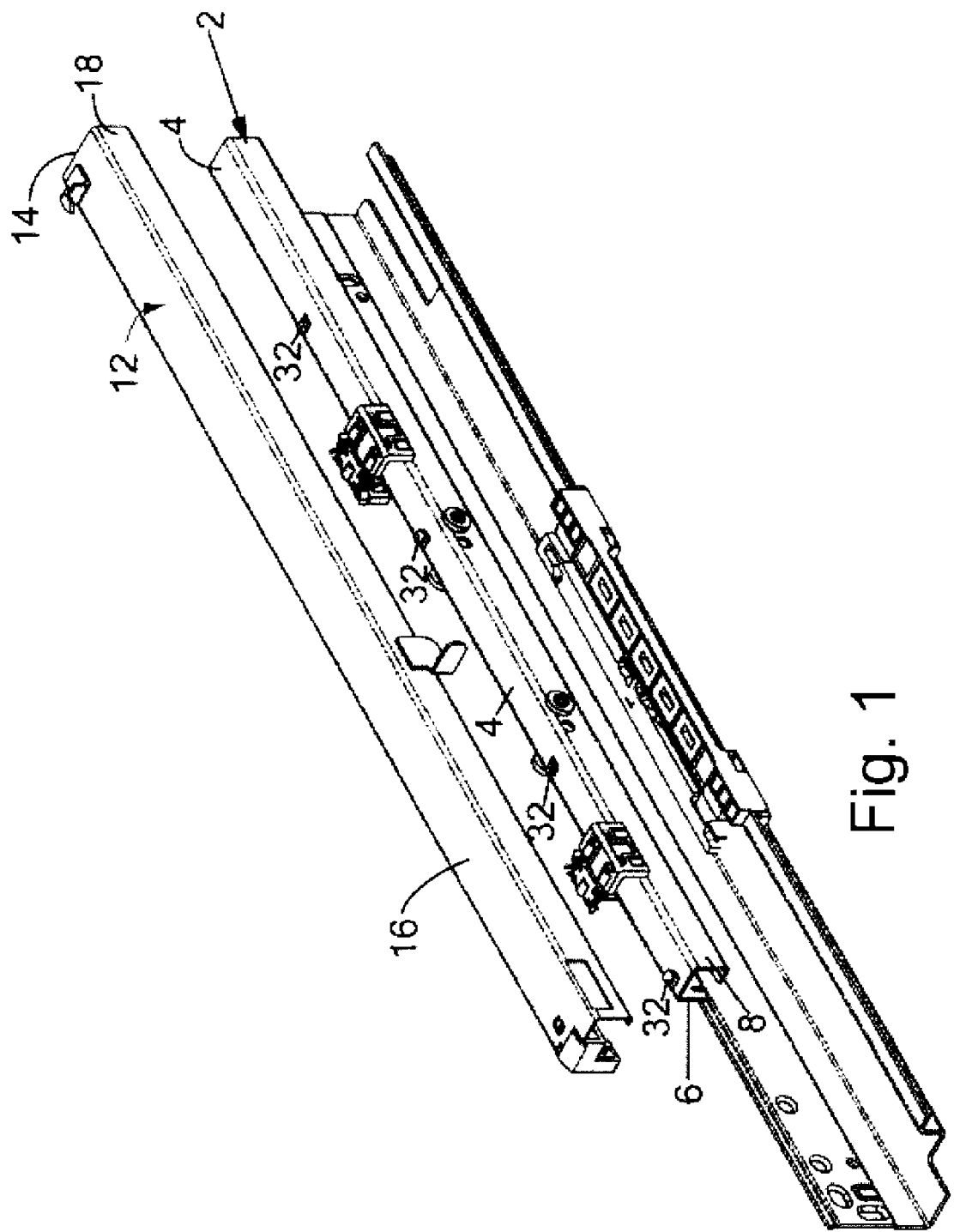
FIG. 1 is an exploded view of a roller and stopper mechanism in place in a drawer slide system in an embodiment of the present invention.
Figure 2:
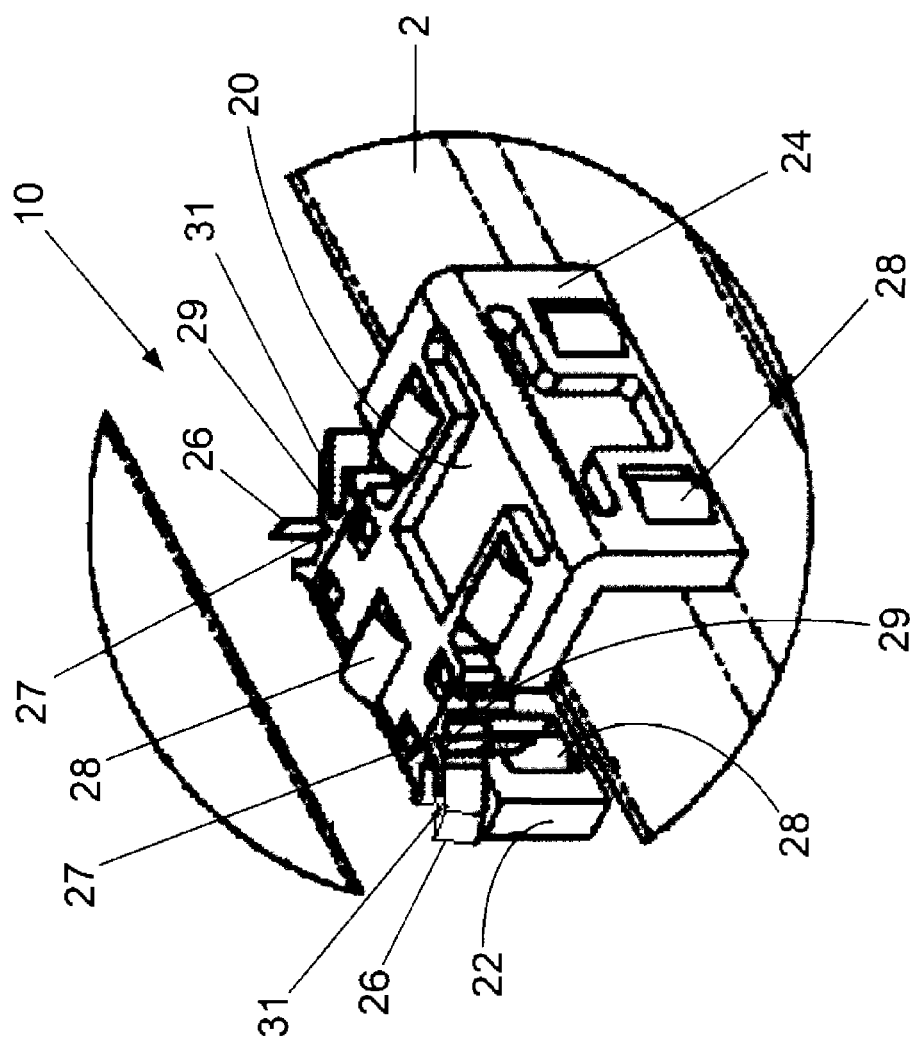
FIG. 2 is a detailed view of a roller and stopper mechanism for a drawer slide system in an embodiment of the present invention.

In a first aspect of the present invention, a roller mechanism for providing a low friction sliding means between two drawers slides is provided. The roller mechanism as seen in FIGS. 1 and 2 comprises a body portion 20 comprising two opposing leg portions 22, 24 extending from said body portion 20. The body portion 20 and leg portions 22, 24 further comprise roller means 28 for providing a low friction sliding means between two drawer slides.

In one embodiment of the present invention, the roller mechanism is dimensioned and configured to fit over and engage a first drawer slide member 2, while a second drawer slide member 12 is fitted and engaged over the top of the roller mechanism 10 and first drawer slide mechanism 2. In this manner, the roller mechanism 10 is "sandwiched" by the two drawer slide members and housed within a cavity therein. In a preferred embodiment of the present invention, the roller mechanism 10 simultaneously contacts three surfaces 4, 6, 8 of the first drawer slide 2, and three surfaces 14, 16, 18 of the second drawer slide 12.

The body portion 20 is substantially flat and rectangular in shape. The size and shape of the body portion 20 preferably corresponds to the shape and dimensions of the drawer slide members to which it is to be engaged. Furthermore, the body portion is fitted with at least one, and preferably a plurality, of roller means 28 for engaging the drawer slide members. In an assembled drawer slide, the body portion 20 lies between two drawer slide members such that it is positioned between a first surface 4 of the first drawer slide 2 and a first surface 14 of the second drawer slide 12.

Extending from opposite ends of the body portion 20 are two legs 22, 24. The legs 22, 24 extend from the body portion 20 in the same direction and preferably are dimensioned and configured to encompass a drawer slide member. Each leg 22, 24 comprises at least one, and preferably a plurality, of roller means 28 for engaging opposing drawer slide members. In an assembled drawer slide system, first leg 22 lies between the second surface 6 of the first drawer slide 2, and the second surface 16 of the drawer slide 12. Similarly, the second leg 24 lies between the third surface 8 of the first drawer slide 2, and the third surface 18 of the second drawer slide 12.

Roller means 28 are provided on the body portion 20 and each leg 22, 24 of the roller mechanism 10. In a preferred embodiment of the present invention, the roller means 28 comprise cylindrical rollers positioned within the roller mechanism 20 such that each roller extends through the mechanism 20 to engage one face of each drawer slide simultaneously. Roller apertures are provided in the roller mechanism in which the rollers 28 are mounted. By fabricating the individual rollers with hollow centers, or indentations at either end of the cylinder, they are mountable in the roller apertures by providing a raised protrusion on either end of the roller aperture. A snap-fit engagement is thereby provided between the roller 28 and the roller aperture by pushing the roller 28 into the aperture such that the raised protrusions enter the indentations on either side of the roller. This allows the raised protrusions to act as an axle for the roller to rotate around which also holds the roller in position within the roller mechanism 28.

In another embodiment of the present invention, the rollers 28 comprise spherical balls rotating within channels in the faces of the roller mechanism 10. The balls, like the rollers, contact the opposing faces of the two drawer slides and rotate therebetween to provide a low friction contact between the slide members.

In an additional preferred embodiment of the present invention, the roller mechanism freely moves between the two drawer slide members along at least a portion of the length of said drawer slide members. In this manner, the roller mechanism 10 contacts different portions of each drawer slide depending on the relative portion of the drawer. In this manner, the drawer slides are supported and held apart at optimal points along their length. The position of the roller mechanism 10 within the cavity formed by the drawer slide members is controlled by a pair of stopper engagement means 32 located along the length of at least one drawer slide. The roller mechanism 10 is then free to move within the space defined by the pair of stopper engagement means 32.

Further, in an embodiment of the present invention, more than one roller mechanisms 10 is provided for placement between two drawer slide members. In a most preferred embodiment of the present invention, two roller mechanisms 10 are provided in the drawer slide system.

In the most preferred embodiment of the present invention, the body portion 20 is provided with three rollers 28, and each leg portion 22, 24 is provided with two rollers. The number of rollers can be varied depending on design conditions such as the weight of the drawer assembly and the weight capacity of each roller.

In a second aspect of the present invention, a stopper apparatus is provided on the roller mechanism to absorb impacts between the drawer slide members. In addition to the rollers 28 discussed above, spring means 26 are provided on opposite sides of the roller mechanism 10 to absorb impact in a drawer slide system caused when the drawer is closed rapidly.

In a preferred embodiment of the present invention, one spring means 26 extends from each of opposite sides of the body portion 20 of the roller mechanism 10 in a direction parallel to the length of the drawer slides 2, 12. Further, stopper engagement means 32 are provided on each of the drawer slide members for contacting and halting the movement of the roller mechanism 10. The traveling distance of the drawer slides is therefore regulated by the position of the stopper engagement means 32.

The roller and stopper mechanism is free to travel along and between the drawer slides until it reaches one of the stopper engagement means 32. Upon contact with one of the stopper engagement means, the roller and stopper mechanism will stop moving with respect to that particular drawer slide. When the stopper engagement means 26 on the opposing drawer slide contacts the spring means 26 on the opposite side of the roller and stopper mechanism, the drawer slides will be stopped from further movement relative to each other. The spring means 26 on either side of the roller and stopper mechanism will absorb the impact between the two stopper engagement means, and the roller and stopper mechanism. When the spring means 26 contact the stopper engagement means 32, the spring means 26 compress thereby absorbing some of the impact force of the collision.

In a further preferred embodiment of the present invention, the spring means 26 comprise at least one thin protrusion from side of the roller mechanism 10. The protrusion 31 extends at an angle from the body of the roller mechanism 10 as shown in FIG. 2, and is designed such that it can flex or bend to absorb impact. In a more preferred embodiment of the present invention, the spring means 26 comprises two protrusions 31 extending from the body portion 20 as likewise shown in FIG. 2. In one embodiment of the present invention, the two protrusions 31 extend at different angles measured from the body portion to provide different impact absorbing qualities. However, in a preferred embodiment of the present invention, the protrusions extend from the sides of the body portion at substantially the same angle in opposite directions; i.e. one protrusion extending at an angle of 30° measured perpendicular to the sliding direction of the drawer, and the other protrusion extending at an angle of 150°, or angles of 40° and 140°, respectively.

In a further embodiment of the present invention, the protrusions may otherwise be configured to bend or turn so as to provide further impact absorbing capacity. Further, the protrusions are provided with substantially flat surfaces extending substantially perpendicular to the length of the drawer slides for engaging the stopper engagement means 32 on the drawer slide members.

In the embodiment of the invention shown in FIG. 2, the spring means comprises at least two spring arms 26, each of which has a first section 27 extending from the body portion 20 of the roller mechanism 10 in a substantially straight line that is substantially perpendicular to one of the opposing sides of the body portion 20 and substantially parallel to the first section of the other spring arm to a bend 29 at the end of the first section 27. As further shown in FIG. 2, each of the spring arms 26 has a second section 31 that extends from the bend 29 at the end of the first section 27 in a substantially straight line oblique (i.e. neither perpendicular nor parallel) to the first section 27 in a direction away from the second section of the other spring arm to an end of the second section 31 that is also the end of the spring arm 26.

In another embodiment of the present invention, the spring means 26 comprises a coiled spring for engaging the stopper engagement means 32 and absorbing a portion of the impact force. In a still further embodiment of the present invention, the spring means comprises a foam or rubber bumper, or any other suitable force absorbing means mountable to the roller mechanism 10.

In an additional embodiment of the present invention, the spring means 26 extend from one or both of the legs 22, 24 rather than, or in addition to the body member 20.

In one embodiment of the present invention, the stopper engagement means 32 on the drawer slides comprises a raised portion of the drawer slide. In an alternate embodiment of the present invention, the stopper engagement means 32 comprises a stopper that has been bolted, screwed, clipped, or otherwise affixed to the drawer slide, which will arrest the motion of the roller mechanism 10.

In a preferred embodiment of the present invention, the roller mechanism 20, rollers 28, and spring means 26 are all manufactured from a plastics based material.

In one embodiment of the present invention, a drawer slide system is provided including at least two drawer slides with at least one roller and stopper mechanism disposed therebetween. In a preferred embodiment of the present invention, two stoppers are provided between the drawer slides, one toward the front portion of the drawer slide system and one toward the rear of the drawer slide system so as to evenly distribute the load between the two.

As shown in FIG. 1, the first drawer slide member 2 has two ends, and a first pair of spaced-apart stopper elements 32, 32 are disposed proximate a first of the two ends of the first drawer slide member and a second pair of spaced-apart stopper elements 32, 32 are disposed between the first pair of stopper elements 32, 32 and second of the two ends of the first drawer slide member 12. As further shown in FIG. 1, a first of the two stopper elements of the first pair of stopper elements 32, 32 is spaced from a second of the two stopper elements of the first pair of stopper elements 32, 32 by a distance that is substantially equal to a distance by which a first of the two stopper elements of the second pair of stopper elements 32, 32 is spaced from a second of the two stopper elements of the second pair of stopper elements 32, 32. Referring to FIGS. 1 and 2, a first of the two roller mechanisms 10 has a first pair of spring arms 26 extending from a first of the two sides of the body portion 20 of the first roller mechanism 10 and a second pair of spring arms 26 extending from a second of the two sides of the body portion 20 of the first roller mechanism 10. Referring further to FIGS. 1 and 2, the first roller mechanism 10 is rollingly supported on the first drawer slide member 2 between a first position of the first roller mechanism with a first of the two spring arms of the first pair of spring arms 26 of the first roller mechanism 10 aligned to abut the first stopper element of the first pair of stopper elements 32, 32 and a second position of the first roller mechanism 10 with a first of the two springs arm of the second pair of spring arms 26 of the first roller mechanism disposed directly opposite the first spring arm of the first pair of spring arms 26 of the first roller mechanism 10 aligned to abut the second stopper element of the first pair of stopper elements 32, 32 as shown in FIG. 1. Referring again to FIGS. 1 and 2, a second of the two roller mechanisms 10 has a first pair of spring arms 26 extending from the first of the two sides of the body portion 20 of the second roller mechanism and a second pair of spring arms 26 extending from the second of the two sides of the body portion 20 of the second roller mechanism 10. Referring once more to FIGS. 1 and 2, the second roller mechanism 10 is rollingly supported on the first drawer slide member between a first position of the second roller mechanism 10 with a first of the two spring arms of the first pair of spring arms 26 of the second roller mechanism 10 aligned to abut the first stopper element of the second pair of stopper elements 32, 32 and a second position of the second roller mechanism 10 with a first of the two spring arms of the second pair of spring arms 26 of the second roller mechanism 10 disposed directly opposite the first spring arm of the first pair of spring arms 26 of the second roller mechanism 10 aligned to abut the second stopper element of the second pair of stopper elements 32, 32. Referring further to FIG. 1, the second drawer slide member 2 is rollingly supported on the first and second roller mechanisms 10.

Although the present invention has been described with reference to particular embodiments, it should be recognized that these embodiments are merely illustrative of the principles of the present invention. Those of ordinary skill in the art will appreciate that the apparatus and methods of the present invention may be constructed and implemented in other ways and embodiments. Accordingly, the description herein should not be read as limiting the present invention, as other embodiments also fall within the scope of the present invention.

What is claimed is:

1. A drawer slide assembly comprising:
   a first drawer slide member having opposing first and second ends, said first drawer slide member having a first pair of spaced-apart stopper elements disposed proximate the first end of first drawer slide member and a second pair of spaced-apart stopper elements disposed between the first pair of stopper elements and the second end of the first drawer slide member, a first stopper element of the first pair of stopper elements being spaced from a second stopper element of the first pair of stopper elements by a distance that is substantially equal to a distance by which a first stopper element of the second pair of stopper elements is spaced from a second stopper element of the second pair of stopper elements;
   a first roller mechanism having a substantially flat, rectangular body portion comprising two opposing ends and opposing first and second sides, and having a roller associated therewith; said first roller mechanism having a first leg portion extending substantially perpendicular from one end of the body portion, and having a roller associated therewith; and a second leg portion extending substantially perpendicular from the opposite end of the body portion, and having a roller associated therewith;
   a first pair of spring arms extending from the first side of the body portion of the first roller mechanism, and a second pair of spring arms extending from the second side of the body portion of the first roller mechanism, said first roller mechanism being rollingly supported on the first drawer slide member between a first position of the first roller mechanism with a first spring arm of the first pair of spring arms of the first roller mechanism aligned to abut the first stopper element of the first pair of stopper elements and a second position of the first roller mechanism with a first spring arm of the second pair of spring arms of the first roller mechanism disposed directly opposite the first spring arm of the first pair of spring arms aligned to abut the second stopper element of the first pair of stopper elements;
   a second roller mechanism having a substantially flat, rectangular body portion with opposing first and second sides and a first pair of spring arms extending from the first side of the body portion of the second roller mechanism and a second pair of spring arms extending from the second side of body portion of the second roller mechanism, said second roller mechanism being rollingly supported on the first drawer slide member between a first position of the second roller mechanism with a first spring arm of the first pair of spring arms of the second roller mechanism aligned to abut the first stopper element of the second pair of stopper elements and a second position of the second roller mechanism with a first spring arm of the second pair of spring arms of the second roller mechanism disposed directly opposite the first spring arm of the first pair of spring arms aligned to abut the second stopper element of the second pair of stopper elements; and a second drawer slide member rollingly supported on the first and second roller mechanisms.

2. A drawer slide system comprising:

a first drawer side member having a first surface and having a second and third surface extending from the first surface in a direction substantially parallel to one another, said first drawer slide member having opposing first and second ends and a first pair of spaced-apart stopper elements disposed proximate the first end of the first drawer slide member and a second pair of spaced-apart stopper elements disposed between the first pair of stopper elements and the second end of the first drawer slide member, a first stopper element of the first pair of stopper elements being spaced from a second stopper element of the first pair of stopper elements by a distance that is substantially equal to a distance by which a first stopper element of the second pair of stopper elements is spaced from a second stopper element of the second pair of stopper elements;

a second drawer slide member for engaging with and sliding upon said first drawer slide member comprising a first surface substantially parallel to the first surface of the first drawer slide member, and corresponding second and third surfaces; wherein the second drawer slide member is configured so as to fit over and encompassing the first drawer slide member;

a first roller mechanism having a substantially flat, rectangular body portion with two opposing ends and opposing first and second sides, and having a roller associated therewith; said first roller mechanism having a first leg portion extending substantially perpendicular from one end of the body portion, and having a roller associated therewith; and a second leg portion extending substantially perpendicular from the opposite end of the body portion, and having a roller associated therewith;

a first pair of spring arms extending from the first side of the body portion of the first roller mechanism, and a second pair of spring arms extending from the second side of the body portion of the first roller mechanism, said first roller mechanism being rollingly supported on the first drawer slide member between a first position of the first roller mechanism with a first spring arm of the first pair of spring arms of the first roller mechanism aligned to abut the first stopper element of the first pair of stopper elements and a second position of the first roller mechanism with a first spring arm of the second pair of spring arms of the first roller mechanism disposed directly opposite the first spring arm of the first pair of spring arms of the first roller mechanism aligned to abut the second stopper element of the first pair of stopper elements;

a second roller mechanism having a substantially flat, rectangular body portion with opposing first and second sides and a first pair of spring arms extending from the first side of the body portion of the second roller mechanism and a second pair of spring arms extending from the second side of the body portion of the second roller mechanism, said second roller mechanism being rollingly supported on the first drawer slide member between a first position of the second roller mechanism with a first spring arm of the first pair of spring arms of the second roller mechanism aligned to abut the first stopper element of the second pair of stopper elements and a second position of the second roller mechanism with a first spring arm of the second pair of spring arms of the second roller mechanism disposed directly opposite the first spring arm of the first pair of spring arms of the second roller mechanism aligned to abut the second stopper element of the second pair of stopper elements; and said second drawer slide member being rollingly supported on the first and second roller mechanisms.

3. The drawer slide system of claim 2, wherein the roller mechanism are free to slide between the first and second drawer slide members and further provide a low-friction sliding surface between the drawer slides.

* * * * *